(12) United States Patent
Liu et al.

(10) Patent No.: US 10,153,684 B2
(45) Date of Patent: Dec. 11, 2018

(54) BLEEDER CIRCUIT

(71) Applicant: JOULWATT TECHNOLOGY (HANGZHOU) CO., LTD., Hangzhou (CN)

(72) Inventors: Guoqiang Liu, Hangzhou (CN); Bai Lang, Hangzhou (CN); Junming Zhang, Hangzhou (CN); Pitleong Wong, Hangzhou (CN); Yuancheng Ren, Hangzhou (CN); Xunwei Zhou, Hangzhou (CN)

(73) Assignee: Joulwatt Technology (Hangzhou) Co., Ltd., Hangzhou, Zhejiang, P.R. (CN)

( * ) Notice: Subject to any disclaimer, the term of this patent is extended or adjusted under 35 U.S.C. 154(b) by 0 days.

(21) Appl. No.: 15/394,956

(22) Filed: Dec. 30, 2016

(65) Prior Publication Data

US 2018/0115234 A1 Apr. 26, 2018

(30) Foreign Application Priority Data

Oct. 26, 2016 (CN) .......................... 2016 1 0946221
Oct. 26, 2016 (CN) .......................... 2016 1 0947259

(51) Int. Cl.
*H02M 1/00* (2006.01)
*H02M 7/04* (2006.01)
*H05B 33/08* (2006.01)

(52) U.S. Cl.
CPC ............... *H02M 1/00* (2013.01); *H02M 7/04* (2013.01); *H05B 33/0815* (2013.01);
(Continued)

(58) Field of Classification Search
CPC ............... H02M 3/3376; H02M 3/337; H02M 3/33592; H02M 3/338; H02M 3/3385;
(Continued)

(56) References Cited

U.S. PATENT DOCUMENTS 9,214,851 B1 * 12/2015 Mao ..................... H02M 1/08
2011/0193494 A1 * 8/2011 Gaknoki ............. H02M 1/4258
315/297

(Continued)

*Primary Examiner* — Jue Zhang
*Assistant Examiner* — Kevin H Sprenger
(74) *Attorney, Agent, or Firm* — Charles C. Achkar; Ostrolenk Faber LLP

(57) ABSTRACT

The present invention discloses a bleeder circuit; solutions of the present invention may be applied in linear driving and switch driving solutions; a threshold voltage is a zero crossing value, and when the input voltage is zero crossing, the load current at this time is zero; a bleeder current is generated to make the input current greater than a holding current of a TRIAC dimmer, to maintain turning-on of the TRIAC dimmer, and a second time is set as a delay time, which reduces power consumption. In the application of switch driving solution, the current regulating circuit is controlled to be enabled according to the waveform features of the previous and latter halves of periods of the sine wave as well as the size of the input current of the driving circuit. The present invention reduces bleeder current, improves system efficiency and system reliability while ensuring the dimming performance; meanwhile, it is good for enlarging the maximum turning-on angle of TRIAC, and satisfies the requirement for maximum output current more easily.

9 Claims, 20 Drawing Sheets

(52) U.S. Cl.
CPC ..... *H05B 33/0845* (2013.01); *H05B 33/0887* (2013.01); *H02M 2001/0009* (2013.01)

(58) Field of Classification Search
CPC ........... H02M 3/3381; H02M 3/33523; H02M 3/33507; H02M 3/33569; H02M 3/335; H02M 3/33538; H02M 3/157; H02M 3/1584; H02M 1/12; H02M 1/4208; H02M 1/4225; H02M 1/14; H02M 1/15; H02M 1/143; H02M 1/126; H02M 1/4266; H02M 1/34; H02M 7/06; H02M 7/062; H02M 7/217; H02M 7/10; H02M 7/068; H02M 7/219; Y02B 70/1433; Y02B 70/1475; Y02B 70/126; Y02B 70/1441; Y02B 70/123; Y02B 70/1491
USPC ................. 363/17–21.03, 44–48, 52–53, 89, 363/125–127
See application file for complete search history.

(56) References Cited

U.S. PATENT DOCUMENTS

| | | | | |
|---|---|---|---|---|
| 2012/0188794 | A1* | 7/2012 | Chang | H02M 3/33507 363/16 |
| 2012/0319621 | A1* | 12/2012 | Sutardja | H05B 33/0815 315/307 |
| 2016/0218626 | A1* | 7/2016 | Del Carmen, Jr. | H05B 33/0815 |

* cited by examiner

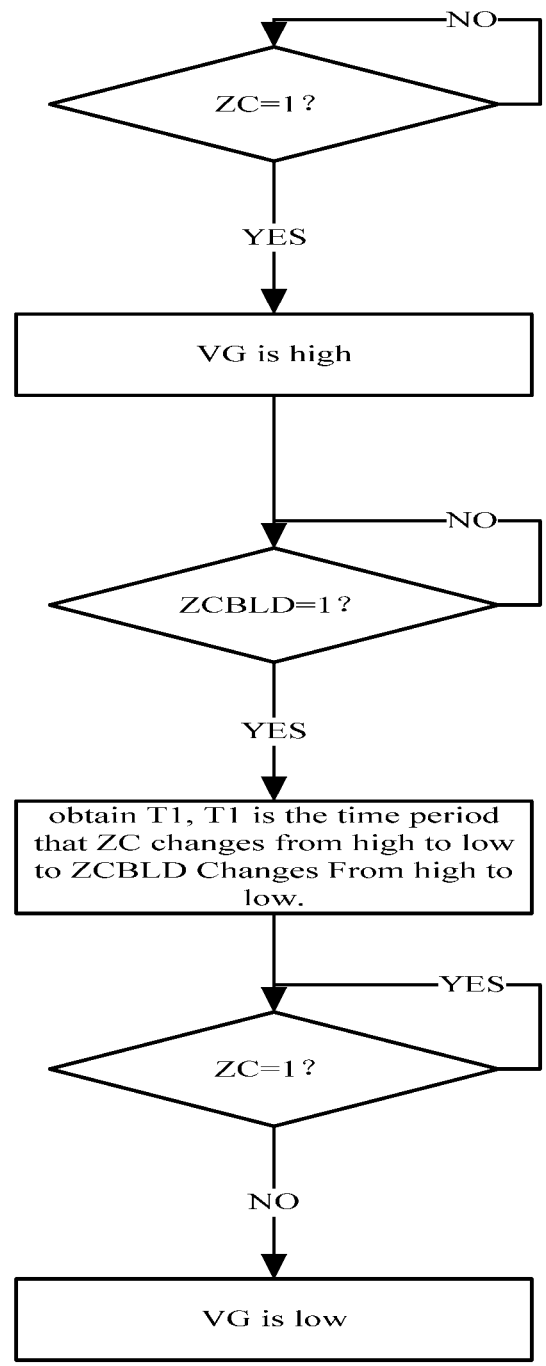
Fig. 9 ( a )

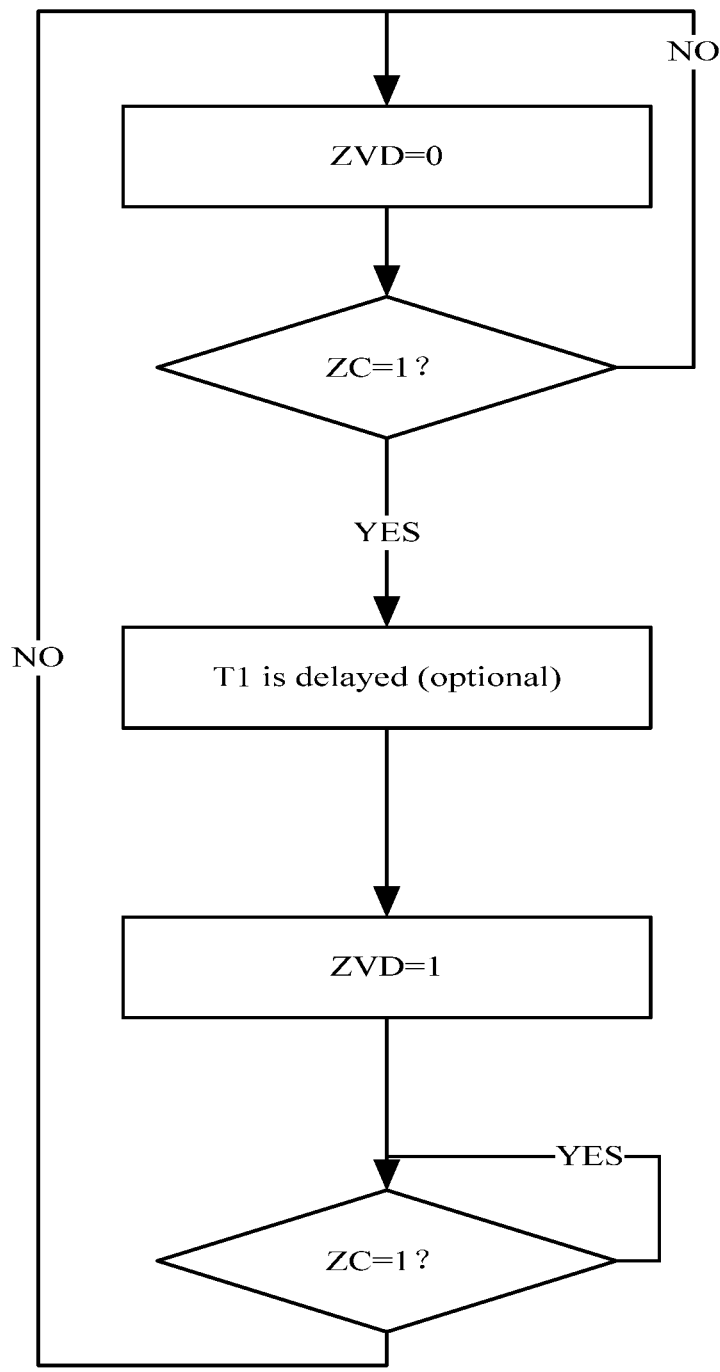
Fig. 9 ( b )

BLEEDER CIRCUIT

CROSS REFERENCE TO RELATED APPLICATIONS

The present application claims priority to Chinese Application No. 201610947259.6, filed on Oct. 26, 2016, and Chinese Application No. 201610946221.7, filed on Oct. 26, 2016, the subject matter of each of which is incorporated by reference in their entirety.

FIELD OF THE INVENTION

The present disclosure relates to the technical field of power electronics, more particularly, to a bleeder circuit which may be applied in an LED control circuit.

BACKGROUND

LED lights are more energy-saving and more environment-friendly as compared with traditional fluorescent or incandescent lights, and thus LED lights gradually replace the existing fluorescent or incandescent lights. For incandescent light with a TRIAC dimmer, it also intends to be replaced by a LED lights, and thus LEDs need to be compatible with the TRIAC dimmer. However, when LED lights are used to replace incandescent lights, since the output terminal voltage of the TRIAC will have great voltage change rate (dv/dt) when it is turned on, great surge current will be generated at the input terminal. The surge current has great shock amplitudes and small duration time, which is easy to cause the TRIAC to be turned off, thus affecting the stable work of the LED driving circuit and making the LED lights flicker; in addition, the input current of the TRIAC device needs to be greater than its holding current; when the input current is smaller than the holding current, it is easy to make the TRIAC to be turned off, which will also cause flickering of LED. In order to solve the above technical problems, the prior art uses the following solutions, which still have some technical defects.

FIG. 1 shows a prior art passive bleeder solution, which uses an RC as the passive bleeder components. This solution has a simple structure and low cost. However, at the end of the power frequency cycle, it cannot provide the current required to keep the TRIAC to turn on. Since capacitor C00 is charged to yin or close to yin after the TRIAC is turned on, and then it is discharged through resistor R00. Since the time constant of RC is large, it may even discharge at the middle or tail of the half period, which reduces the input current instead, and this is not good for the stable turning-on of the TRIAC.

FIG. 2 shows a prior art active bleeder circuit. The input current is sampled by a resistor R02, and the bleeder current iblr is controlled to make the input current not smaller than VREF0/R02, to ensure the turning-on of the TRIAC. This solution may compensate for the input current in an all-input scope, and overcome the defect in the RC solution that it cannot provide current at the tail end. Since it needs to ensure that the input current is not smaller than VREF0/R02 all the time, the solution has the defects of low efficiency and high temperature rising, and it will have an adverse effect on the reliability of the system and increase cost.

SUMMARY

In view of this, the objective of the present invention is to provide a highly efficient bleeder circuit with small power consumption, so as to solve the technical problem in the prior art.

The technical solution of the present invention is to provide a bleeder circuit with the following structures, comprising:

A current regulating circuit, comprising a regulating switch and a current source and/or resistor connected to the regulating switch in series; an input voltage is obtained from an alternating current (AC) input through a TRIAC dimmer and a rectifying bridge to supply load with power through a driving circuit, two ends of the current regulating circuit connected to high and low potential terminals of the input voltage, respectively;

A bleeder control circuit, connected to the control terminal of the regulating switch; when the input voltage is smaller than a threshold voltage, the control terminal of the regulating switch is regulated to make the current regulating circuit generate bleeder current, until the input current or the loading current is greater than a threshold current, then the bleeder current is made to be zero by regulating the control terminal of the regulating switch.

In a preferred embodiment, the bleeder control circuit comprises an input voltage detecting circuit, a load current detecting circuit, and a logic circuit; the logical circuit is connected to the control terminal of the regulating switch, and the input voltage detecting circuit samples the input voltage and compares it with a threshold voltage, and its comparison result is output to the logical circuit; the load current detecting circuit samples the load current and compares it with a threshold current, and its comparison result is output to the logical circuit; the logic circuit receives the comparison result of the input voltage detecting circuit and the comparison result of the load current detecting circuit.

In a preferred embodiment, the bleeder control circuit comprises a load current detecting circuit, a bleeder current detecting circuit, and a logical circuit; the logic circuit is connected to the control terminal of the regulating switch; the load current detecting circuit samples load current and compares it with a threshold current, and its comparison result is output to the logic circuit; the bleeder current detecting circuit samples the bleeder current and compares it with the bleeder threshold, and its comparison result is output to the logical circuit; the logic circuit receives the comparison result of the load current detecting circuit and the comparison result of the bleeder current detecting circuit.

In a preferred embodiment, the determination that the input voltage is lower than the threshold voltage refers to, the load current detecting circuit detects that the load current is smaller than the threshold current, and determines that the input voltage is lower than the threshold voltage after a first time; the first time is counted as follows: when the load current is 0, the current regulating circuit is enabled, and the input current detecting circuit detects that the input current is smaller than the threshold current and starts to count time, and when the bleeder current detecting circuit detects that the bleeder current is smaller than the bleeder threshold, the timing is finished, and the counted time is the first time.

In a preferred embodiment, when the input voltage is smaller than the threshold voltage, bleeder current is generated again after the second time.

Another technical solution of the present invention is to provide a bleeder circuit with the following structure, comprising:

A current regulating circuit, comprising a regulating switch and a current source and/or resistor connected in series with the regulating switch; an input voltage is obtained from an alternating current (AC) input through a TRIAC dimmer and a rectifying bridge to supply load with power through a driving circuit, two ends of the current regulating circuit connected to high and low potential terminals of the input voltage, respectively;

A bleeder control circuit, connected to a control terminal of the regulating switch; at the previous half period of a half sine wave, when the input voltage is lower than a threshold voltage, the current regulating circuit generates bleeder current by regulating the control terminal of the regulating switch, until the input current of the driving circuit is greater than a corresponding threshold current, and the current regulating circuit does not generate bleeder current; at the latter half period of the half sine wave, when the input current of the driving circuit is lower than the corresponding to the threshold current, the control terminal of the regulating switch is regulated to make the current regulating circuit generate bleeder current until the input current of the driving circuit is reduced to a low threshold, and then the current regulating circuit does not generate bleeder current.

In a preferred embodiment, the bleeder control circuit comprises an enable signal generating circuit and a driving control circuit connected to the control terminal of the regulating switch; the enable signal generating circuit generates signals to indicate whether to enable by detecting the input voltage and the input current of the driving circuit, and the driving control circuit receives the signals to indicate whether to enable and controls the status of the regulating switch according to this.

In a preferred embodiment, the enable signal generating circuit comprises an input voltage detecting circuit, a driving circuit input current detecting circuit and a logical circuit, and the input voltage detecting circuit determines whether the input voltage is lower than the threshold voltage, outputs the result to the logical circuit, and the driving circuit input current detecting circuit detects that the input current of the driving circuit achieves the low threshold, the logical circuit outputs signals indicating enabling to the driving control circuit.

In a preferred embodiment, the driving circuit input current detecting circuit detects that the input current of the driving circuit is implemented by the following manners: sampling the bleeder current to get a sample signal indicating bleeder current, and when the sample signals of the bleeder circuit achieves the corresponding reference value, determining that the input circuit of driving circuit achieves the low threshold.

In a preferred embodiment, the driving control circuit receives the current sample signal indicating total input current, and performs error process on the current sample signal and the current reference signal to get a driving voltage, such that when the current regulating circuit is enabled, the driving voltage is used as the voltage of the control terminal of the regulating switch to regulate the bleeder current flowing though the regulating switch.

In a preferred embodiment, the driving voltage is for indicating a size of the input current of the driving circuit, and comparing the driving voltage with the reference voltage indicating the threshold current, the comparison result indicating whether the input current of the driving circuit achieves the threshold current.

In a preferred embodiment, the driving control circuit comprises an error amplifier and a first comparator; a first input terminal of the error amplifier receives current sampling signals indicating a total input current, and its second input terminal receives the current reference signal, and its output terminal outputs driving voltage; the output terminal of the error amplifier is connected to the control terminal of the regulating switch through a switch, and the control terminal of the switch receives a signal indicating whether to enable; meanwhile, the first input terminal of the first comparator receives the driving voltage, and the second input terminal receives a reference voltage indicating a threshold current, and the output terminal of the first comparator outputs signals to indicate whether the input current of the driving circuit achieves the threshold current, and get the corresponding signals to indicate whether to enable.

In a preferred embodiment, the driving circuit input current detecting circuit comprises an adder circuit and a second comparator, and the adder circuit receives a current sample signal indicating total input current and a current sample signal indicating the bleeder current, and directions of two received current sample signals are opposite, and thus the adder circuit outputs a signal to indicate the driving circuit input current; the first input terminal of the second comparator receives reference signals to indicate a low threshold, and the second terminal receives signals indicating the driving circuit input current, and the output terminal of the second comparator is connected to the logic circuit.

Another technical solution of the present invention provides a bleeder circuit with the following structure, comprising:

A current regulating circuit, comprising a regulating switch and a current source and/or resistor connected to the regulating switch in series; an input voltage is obtained from an alternating current (AC) input to through a TRIAC dimmer and a rectifying bridge to supply load with power via a driving circuit, and the two ends of the current regulating circuit are connected to the high and low potentials of the input voltage respectively;

A bleeder control circuit, connected to a control terminal of the regulating switch; at the previous half period of a half sine wave, when the input voltage is lower than a threshold voltage, the current regulating circuit is made to generate bleeder current by regulating the control terminal of the regulating switch until the input current of the driving circuit is greater than a corresponding threshold current, then the current regulating circuit does not generate the bleeder current; at the latter half period of the half sine wave, when the input current of the driving circuit is lower than a corresponding threshold current, the driving circuit is controlled to not be enabled or a loop of the driving circuit is cut off.

The circuit structure of the present invention has the following advantages as compared with the prior art: in the linear driving solution of the present invention, the threshold voltage is a zero crossing value; when the input voltage is zero crossing, a second time may be set as the delay time and the bleeder current is enabled; when the TRIAC dimmer is turned on, in order to make the input current be greater than the holding current, the bleeder current is greater than the holding current of the TRIAC dimmer, to keep the turning of the TRIAC dimmer; when the load current is greater than the holding current of the TRIAC dimmer, the bleeder current is not enabled, and the power consumption is reduced. In the switch driving solution of the present invention, the threshold voltage is a zero crossing value; when the input voltage is zero crossing, the generated bleeder current makes the input current be greater than the holding current of the TRIAC, and the current regulating circuit is controlled whether to enable according to the waveform features of the previous and latter halves of periods of the sine wave and the size of the input current of the driving circuit. The present invention reduces bleeder current, improves system efficiency and system reliability while ensuring the dimming performance; meanwhile, it is good for enlarging the maximum turning-on angle of TRIAC, and satisfies the requirement for maximum output current more easily.

BRIEF DESCRIPTION OF THE DRAWINGS

FIG. 9 (a) is a flowchart block diagram of getting a first time T1 of embodiment three of the bleeder circuit;

FIG. 9 (b) is a flowchart block diagram of embodiment three of the bleeder circuit;

DETAILED DESCRIPTION OF EMBODIMENTS

The following will describe in great detail the preferred embodiments of the present invention by combining the accompanying drawings. However, the present invention is not limited to these embodiments. The present invention covers any replacement, modification, equivalent methods and solutions within the sprints and scope of the present invention.

In order to make the public to thoroughly understand the present invention, the specific details will be described in the following preferred embodiments of the present invention, while those skilled in the art may completely understand the present invention without the description of the details.

The following paragraphs will describe the present invention by way of example by referring to the accompanying drawings. It needs to be explained that the accompanying drawings use simple forms and inaccurate proportions, which merely helps to describe the objective of the embodiments of the present invention conveniently and clearly.

Figure 1:
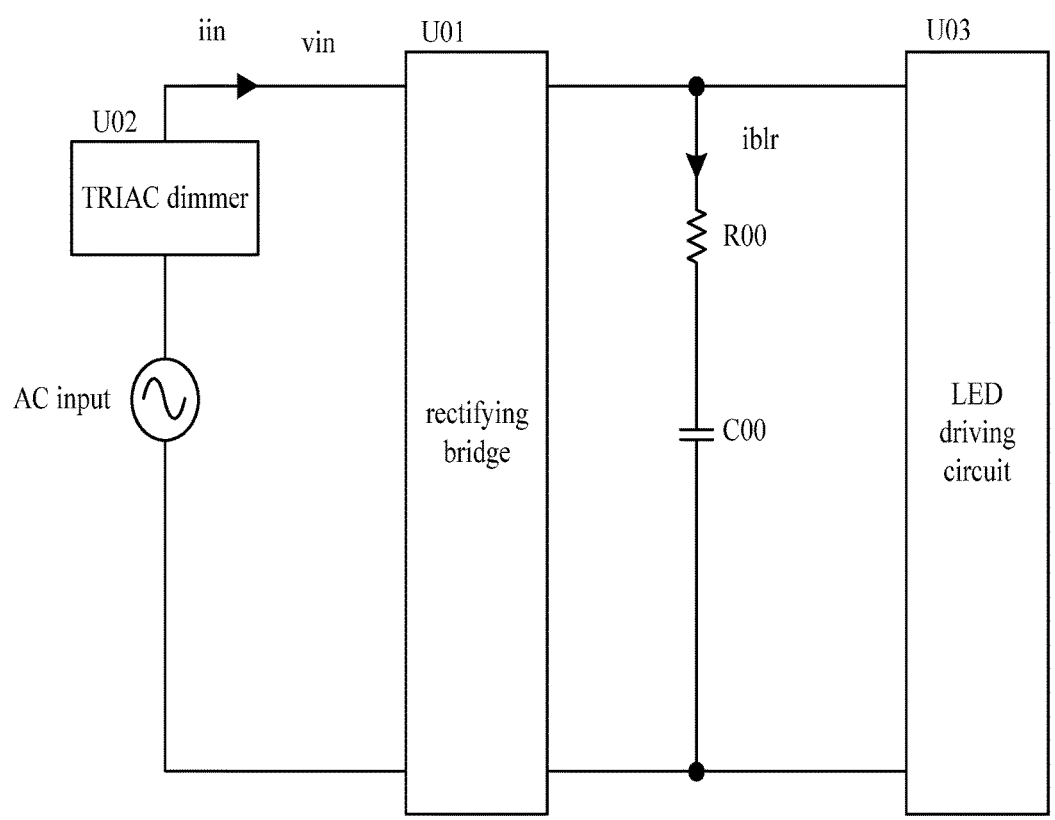
FIG. 1 is a prior art LED control circuit comprising a passive bleeder circuit.
Figure 2:
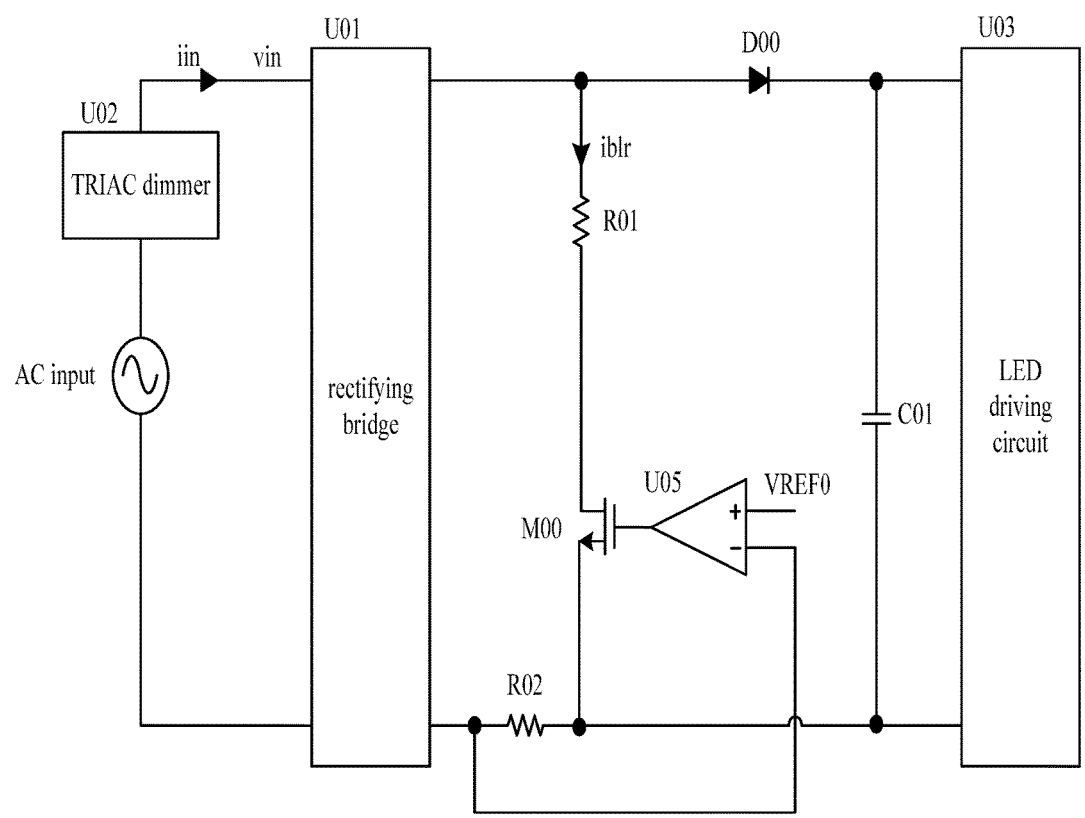
FIG. 2 is a prior art LED control circuit comprising an active bleeder circuit.
Figure 3:
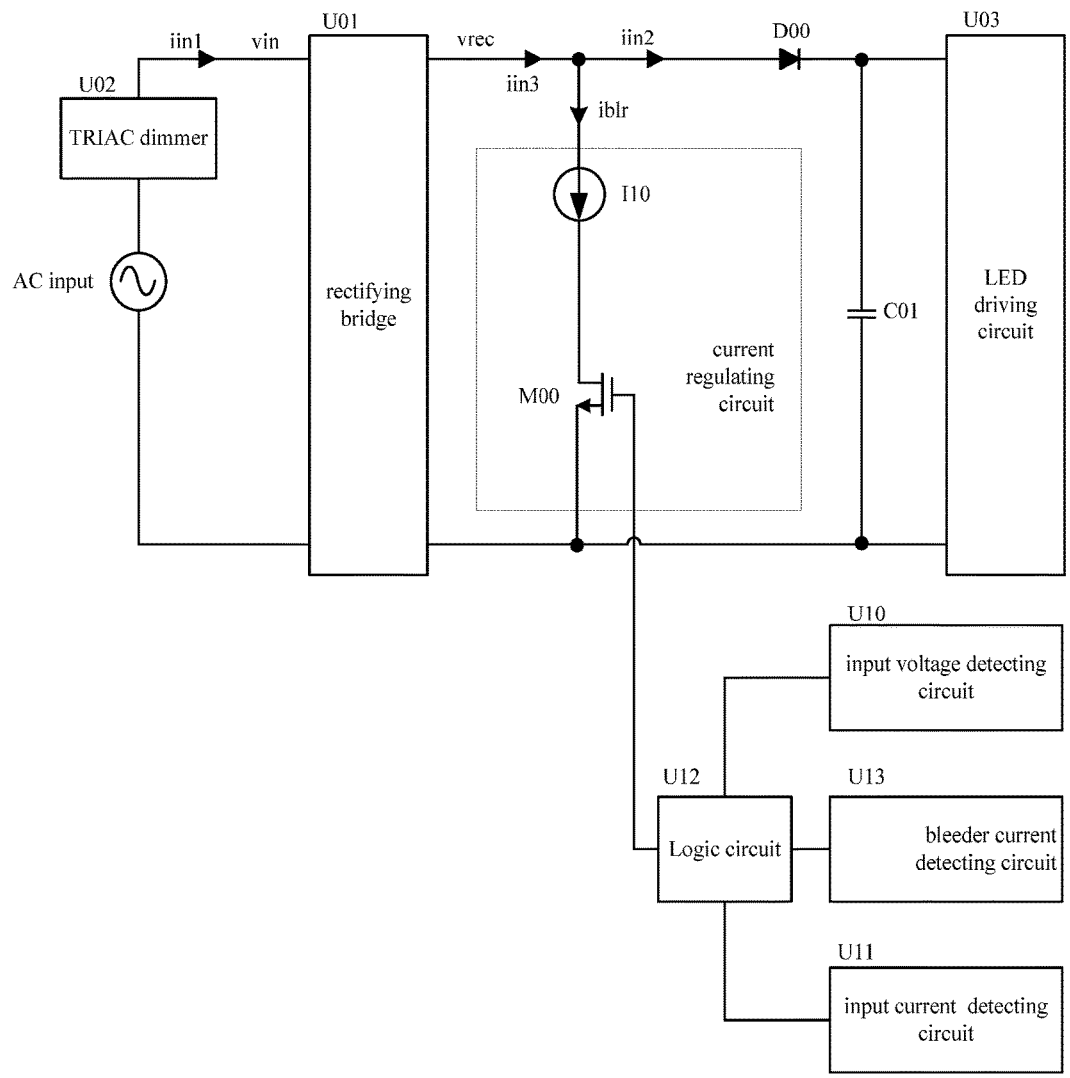
FIG. 3 is a circuit structure schematic view of embodiment one of the bleeder circuit.

FIG. 3 shows a circuit structure of embodiment one of the bleeder circuit of the present invention, taking the condition of applying it into a linearly driven LED control circuit as an example. The LED control circuit comprises a bleeder circuit and an LED driving circuit, and the bleeder circuit is used for solving the flickering problem since the input current is too small under the applying the TRIAC dimmer, and overcomes the existing technical defects in the prior art. The input power supply source is AC input, and the AC input outputs direct current input voltage vrec through the TRIAC dimmer U02 and the rectifying bridge U01, i.e., as the input voltage of LED load. The AC input is connected to the rectifying bridge U01 through the TRIAC dimmer U02; a positive output terminal of the rectifying bridge is connected to the anode of diode D00, and a positive terminal of the LED driving circuit is connected to the cathode of diode D00. Usually the LED driving circuit will be capacitive, and thus diode D00 is added between vrec and the LED driving circuit; when the absolute value of AC input is reduced, the voltage of the LED driving circuit is reduced slowly due to its capacitance, and a sample resistor of input voltage detecting circuit added with diode D00 will make input voltage vrec follow the absolute value of the AC input, so as to ensure the accuracy of sampling the input voltage.

The bleeder circuit comprises a current regulating circuit and a bleeder control circuit, and the current regulating circuit comprises a regulating switch M00 and a power supply source I10 connected in series with the regulating switch, or a resistor is connected in series with the rectifying switch. One end of the current source I10 is connected to the positive output terminal of the rectifying bridge, and the other end of the regulating switch M00 is connected to the negative output terminal of the rectifying bridge U01. When the input voltage vrec is smaller than a threshold voltage, logical circuit U12 controls the current regulating circuit to generate bleeder current which is iblr, and the bleeder current always exists until load current iin2 is greater than the threshold current, and the logic circuit U12 controls the bleeder current as 0.

The bleeder control circuit is connected to the control terminal of the regulating switch M00; the input voltage vrec is detected by the input voltage detecting circuit, and when the input voltage vrec is smaller than the threshold voltage, the current regulating circuit is made to generate bleeder current by the control terminal of the regulating switch M00, and load current iin2 is detected by the load current detecting circuit until the load current is greater than the threshold current, and then the bleeder current iblr is made to be zero by regulating the control terminal of the regulating switch. The bleeder current detecting circuit is for detecting bleeder current iblr flowing through the current regulating circuit, and it can decide the time that the input voltage is lower than the threshold voltage by detecting the bleeder current iblr and by combining with the timing.

When the input voltage vrec is smaller than the threshold voltage, the second time T2 is delayed and the bleeder current is enabled again which makes the maximum tuning-on angle decrease, so as to reduce the bleeder power supply of a big turning-on angle. Generally, the threshold voltage in the present embodiment refers to a zero crossing point, but according to actual conditions of the circuit, it can be biased from the zero point; for example, when diode D00 is introduced, the zero crossing point at this time is usually forward conduction voltage drop of diode D00.

Figure 4:
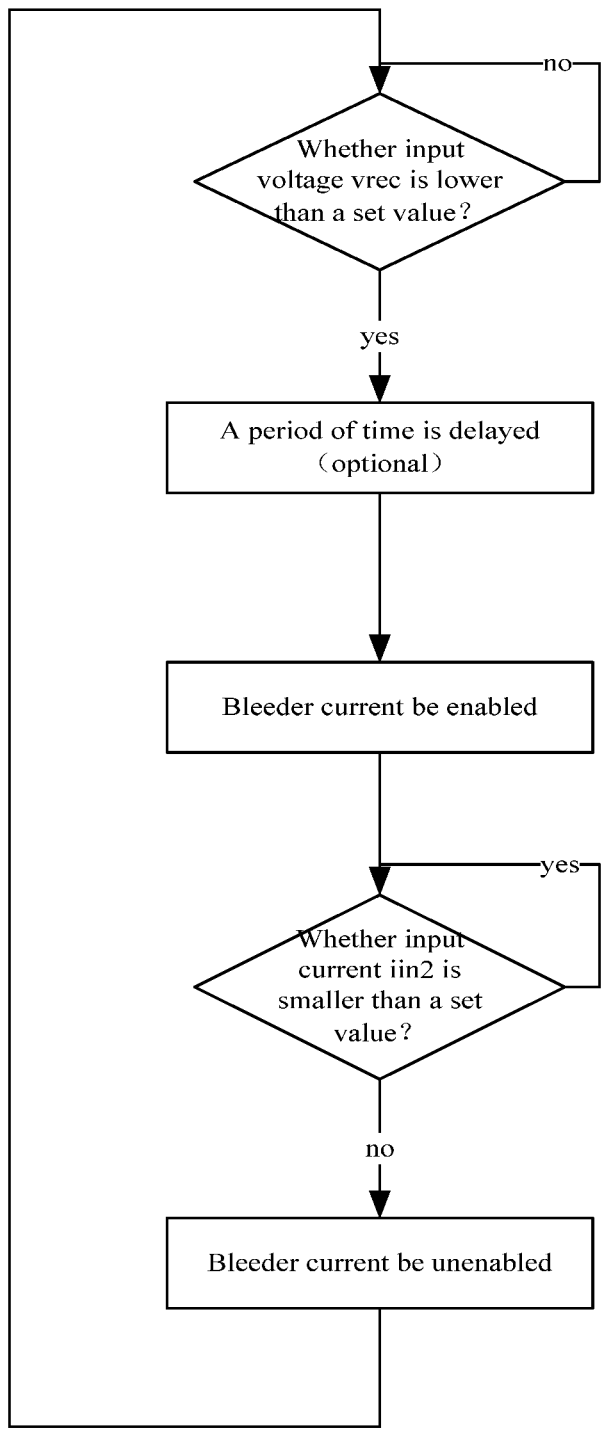
FIG. 4 is a flowchart diagram of embodiment one of the bleeder circuit.

FIG. 4 shows a flowchart diagram of embodiment one of the bleeder circuit of FIG. 3, and the specific processes are as follows: first it is detected whether the input voltage vrec is lower than the threshold voltage, if yes, delay the second time T2, otherwise, continue to detect the input voltage vrec; after T2 is delayed, the bleeder current is enabled, i.e., a bleeder current iblr is generated; then, it is detected whether the load current iin2 is not smaller than a threshold current, and the threshold current is usually larger than a holding current of a TRIAC dimmer, and if yes, continue to detect load current iin2, and if not, the bleeder current iblr is made to be disabled, i.e., the bleeder current is made to be zero.

Figure 5:
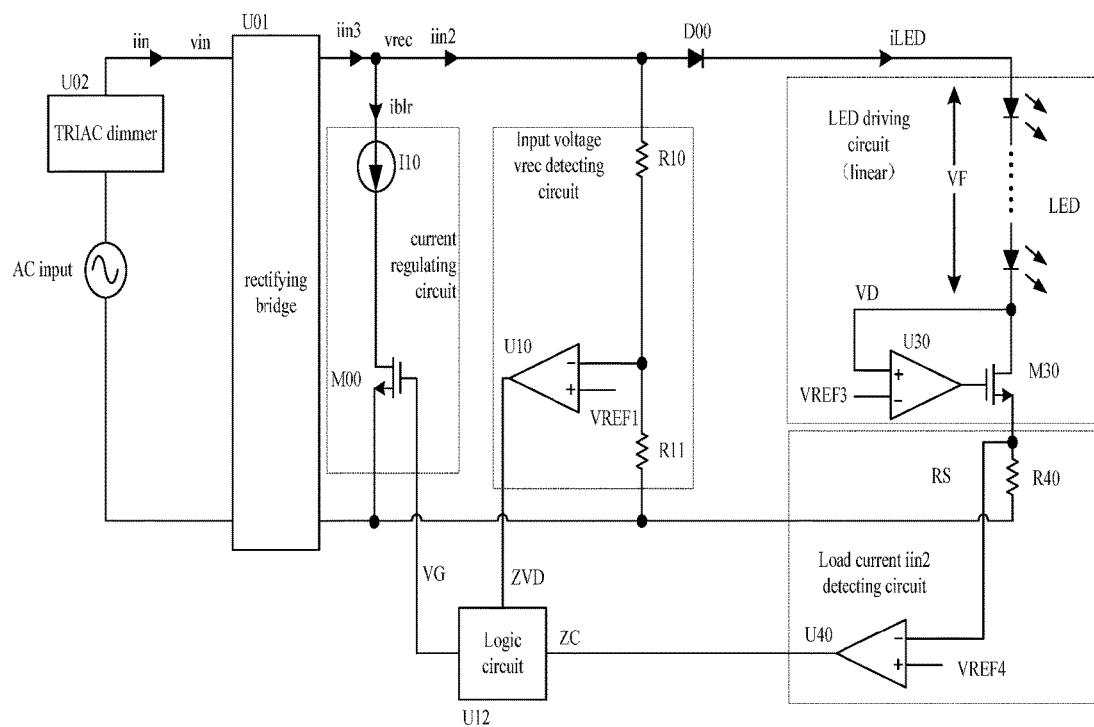
FIG. 5 is a circuit structure diagram of embodiment two of the bleeder circuit.

FIG. 5 shows a circuit structure of embodiment of the bleeder circuit of the present invention, taking the condition of applying it into a linearly driven LED control circuit as an example. The difference between embodiment one and embodiment two lies in that the bleeder control circuit comprises an input voltage detecting circuit and a load current detecting circuit, and it does not use a bleeder current detecting circuit, and meanwhile the structures of the input voltage detecting circuit and the load current detecting current are more specified.

The input voltage detecting circuit samples the input voltage vrec by resistor voltage-dividing; the sample voltage is compared with the reference voltage VREF1, and when the sample voltage is greater than the reference voltage VREF1, the output ZVD of comparator U10 is low; when the sample voltage is smaller than the reference voltage VREF1, the output ZVD of comparator U10 is high. The input voltage vrec detecting circuit is for detecting the zero crossing point of the input voltage. Since the LED driving circuit is capacitive, a diode D00 is added between vrec and the LED driving circuit. When the absolute value of AC input is reduced, since the LED driving circuit is capacitive, its voltage will decrease slowly, and the sample resistor added with diode D00 and the input voltage vrec detecting circuit will make the vrec voltage follow the absolute value of AC input, so as to ensure the accuracy of sampling the input voltage. The input voltage vrec detecting circuit is not only limited to the manners in this embodiment, but also relates to other input voltage detecting manners in latter embodiments, and they can be applied in the embodiment. When the LED driving circuit is a linear driving circuit, the LED current may be sampled by adding a sample resistor R40 between the output terminal of the LED driving circuit and the negative output terminal of the rectifying bridge; when diode D00 is turned on, since the current of the input voltage vrec detecting circuit is far smaller than the LED current, the current flowing through the sample resistor R40 is approximately to be current iin2. Especially, when the LED current is large, the current flowing through resistor R40 is equal to current iin2. The sample resistor R40 has a sample voltage of RS and is connected to the negative input terminal of comparator U40, and the positive input terminal of comparator U40 is connected to the reference voltage VREF4. When voltage RS is greater than VREF4, output ZC of comparator U40 is low; otherwise, output of U40 is high. The manner of detecting load current iin2 is not only limited to the manner in the embodiment, and since here linear driving is used, it is convenient to use the manner of using a sample resistor to detect current.

Figure 6:
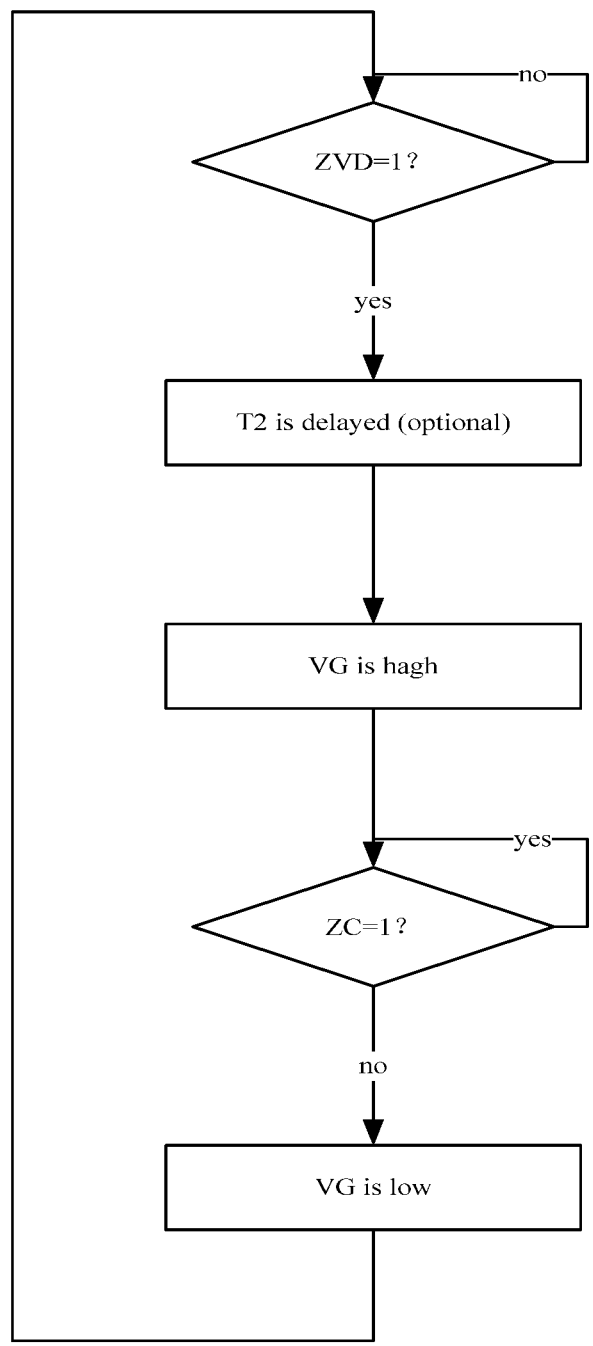
FIG. 6 is a flowchart diagram of embodiment two of the bleeder circuit.
Figure 7:
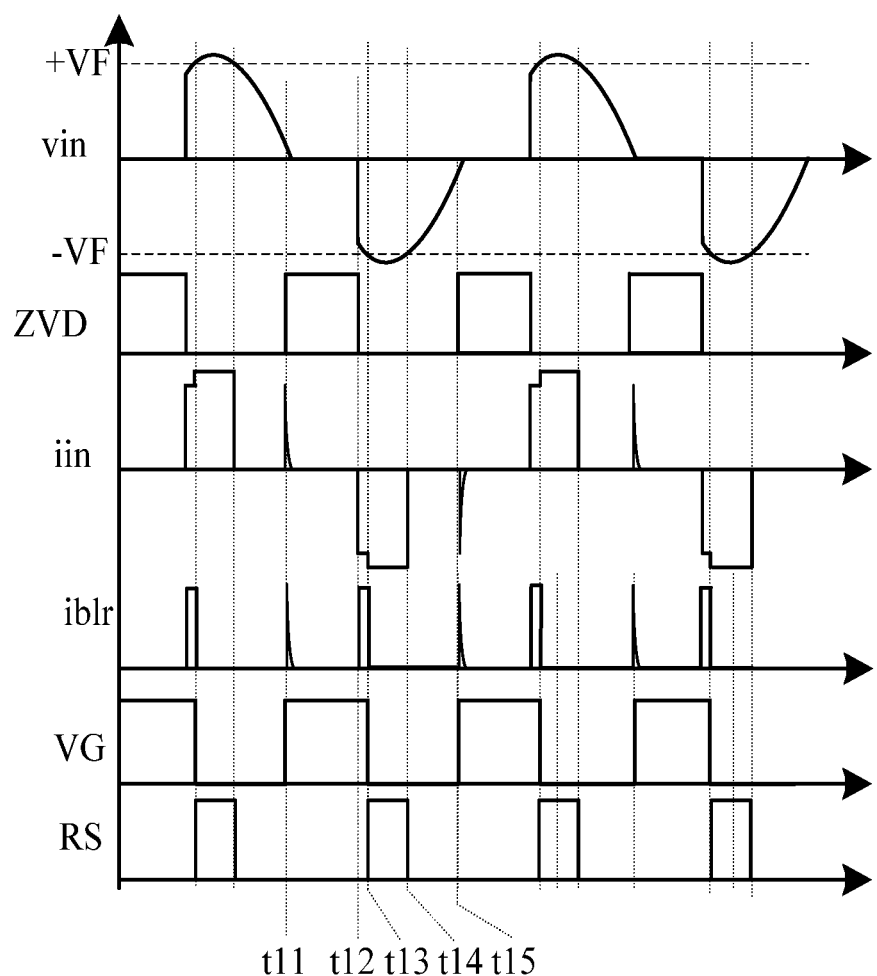
FIG. 7 is a working waveform of embodiment two of the bleeder circuit.

FIG. 6 shows a flowchart block diagram of embodiment two of the bleeder circuit shown in FIG. 5, taking the condition of applying it in a linearly driven LED control circuit as an example. FIG. 7 shows a work waveform of embodiment two of the bleeder circuit. The correspondence between the working process and signals of embodiment two is further described by combining FIGS. 6 and 7.

The output ZVD of the input voltage vrec detecting circuit and the output ZC of load current iin2 detecting circuit are both connected to logical circuit U12, and the output of the logic circuit U12 is connected to the input of the bleeder circuit. The logic circuit determines whether the output ZVD of the input voltage vrec detecting circuit is high, i.e., detecting whether the input voltage vrec is lower than a certain value (usually a zero crossing point); when ZVD is high, the second time T2 is delayed to pull up the output VG, i.e., time t11 in FIG. 7 (the delayed time T2 is not added in the waveform figure). T2 is properly prolonged to reduce the maximum turning-on angle of TRIAC, which can further reduce the bleeder power consumption of a big turning-on angle. At this time, since input voltage vrec is smaller than the positive turning-on voltage reduction VF of the LED load, LED current is zero, i.e., ZC is high. Between t11 to t12, since the TRIAC dimmer is not turned on, the input voltage vrec is low while VG is always high; the bleeder current is enabled, but the bleeder current is 0. At time t12, the TRIAC dimmer is turned on, and since input voltage vrec is lower than the forward conduction voltage drop of VF of LED load, LED current is 0, i.e., iin2=iLED=0, iin3=iblr, and current iblr of the bleeder circuit is for keeping the TRIAC dimmer turned on. The voltage drop RS on resistor R40 is zero, and ZC is still high. At time t13, when the input voltage vrec achieves the forward conduction voltage drop of LED, there is current on the LED load, and the current may maintain the normal turning-on of the TRIAC; at this time, ZC signal changes from high to low, and the output VG of the logic circuit changes from high to low; the bleeder circuit is not enabled, switch M00 is turned off, and the bleeder current is 0. At time t13 to t14, the input voltage vrec is always greater than the forward conduction voltage drop VF of the LED. At time t14, the input voltage vrec is smaller than the forward conduction voltage drop VF of the LED, and LED current is 0; moreover, the bleeder current is not enabled, and thus the input current iin3 is also 0; until time t15, ZVD is high and the bleeder circuit is enabled.

Figure 8:
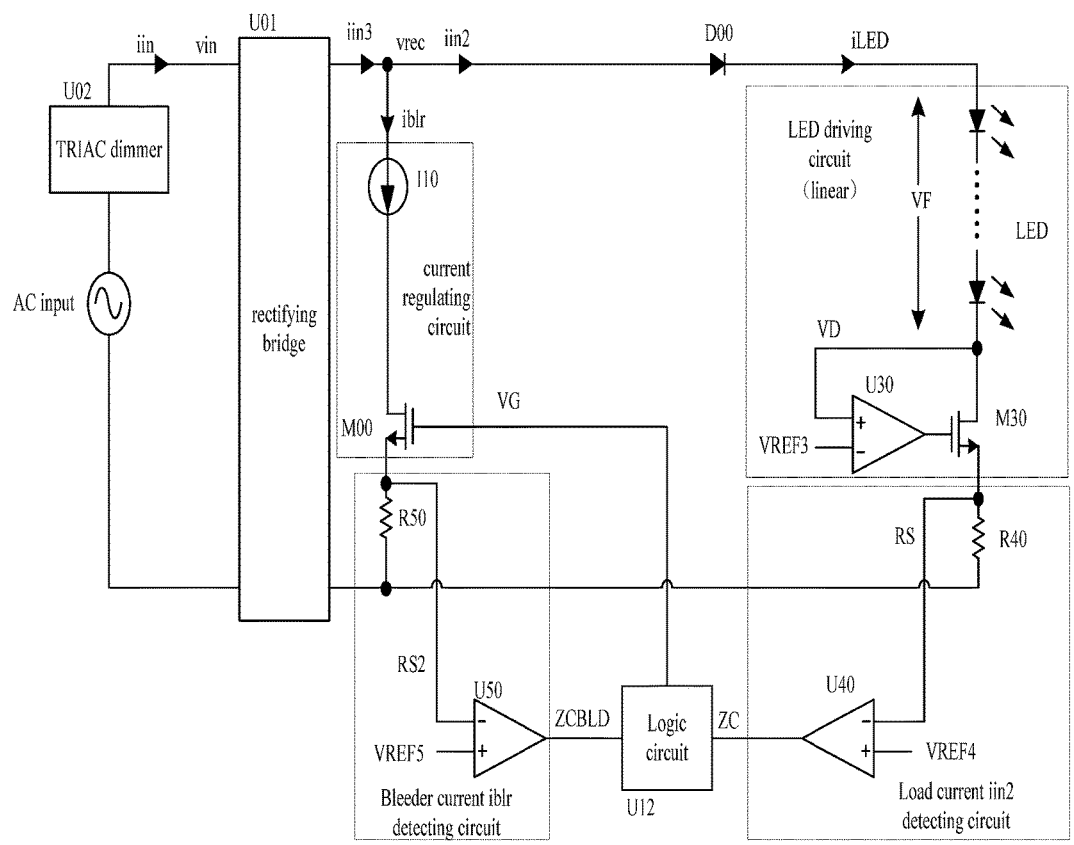
FIG. 8 is a circuit structural diagram of embodiment three of the bleeder circuit.

FIG. 8 shows a circuit structure of the bleeder circuit of embodiment three of the present invention, taking the condition of applying it in a linearly driven LED control circuit as an example. The difference between embodiment three and embodiment two lies in that the ways that the two determination of the input voltage vrec is lower than the threshold voltage (i.e., zero crossing point) is different; embodiment two uses a direct comparison way, while embodiment three uses a time counting way, and its advantage is that it does not need to perform resistor sampling of voltage-dividing. Since the voltage-dividing resistor in embodiment two needs a high-voltage resistor which has high cost within chips and does not match well with low-voltage resistors, it is not good for circuit integration. Meanwhile, the bleeder circuit needs to be sampled as a time node for determination, and thus a bleeder circuit detecting circuit is added on the basis of embodiment 2.

FIG. 9 (a) shows a flowchart block diagram of getting a first time T1 in the bleeder circuit in embodiment three of the present invention, wherein the first time T1 is the time from the zero crossing point of load current iin2 (from the current being greater than 0 to the current being 0) to the zero crossing point of input voltage vrec. The CTL signal in the logic circuit is for recording whether the logic circuit has saved the first time T1. When CTL=1, it means T1 is not yet saved, and the first time T1 is still being sampled; when CTL=0, it means T1 has been saved. When the system is initiated, CTL=1. When vrec is greater than the forward conduction voltage drop Vf of the diode, load current iin2 flows, and the output ZC of comparator U40 is low; when vrec is smaller than VF, load current iin2 is 0, and ZC is high, and the logic circuit U12 enables the bleeder current, i.e., control VG as high. Different from embodiment 2, when the first time T1 is sampled, at time t14 to t15 of FIG. 7, the bleeder circuit is still enabled, and resistor R59 detects current of the bleeder circuit; when the bleeder circuit iblr is 0, the output ZCBLD of comparator U50 is high. At this time, logic circuit U12 records the time between the rising edge of ZC to the rising edge of ZCBLD as T1, and saves T1 in logic circuit U12. After logic circuit U12 saves the first time T1, CTL is set to 0, and the bleeder circuit is not enabled at times t14 to t15.

FIG. 9 (b) shows a flowchart block diagram of detecting the input voltage vrec after getting the first time T1 in embodiment three of the bleeder circuit of the present invention. Since one of the objectives of embodiments 2 and 3 is to determine the zero crossing point of input voltage vrec, and relationship between the signals of the two may be combined with each or replaced by each other. Therefore, in this drawing, the corresponding signals in FIG. 8 are used to indicate the comparison result ZVD between the input voltage and threshold voltage in FIG. 5, just substituting the corresponding signals. When the logic circuit has saved T1, it may obtain the ZVD signal without detecting the vrec voltage. At first, ZVD=0, which means that the input voltage yin is high, and the logic circuit U12 determines whether the LED driving circuit flows, i.e., determining whether ZC signal is 1; when the current of LED driving circuit is 0, ZC=1, and after T1 is delayed, ZVD=1, which means that the input voltage is 0, i.e., zero crossing signal of the input voltage is obtained. Continue to determine the ZC signal, and when the absolute value of the input voltage is greater than the LED conduction voltage drop VF of the LED, the LED driving current flows, i.e., ZC=0, then ZVD=0. The ZVD signal is placed into the flowchart block diagram of FIG. 6, so as to get the flowchart block diagram of FIG. 6.

Figure 10:
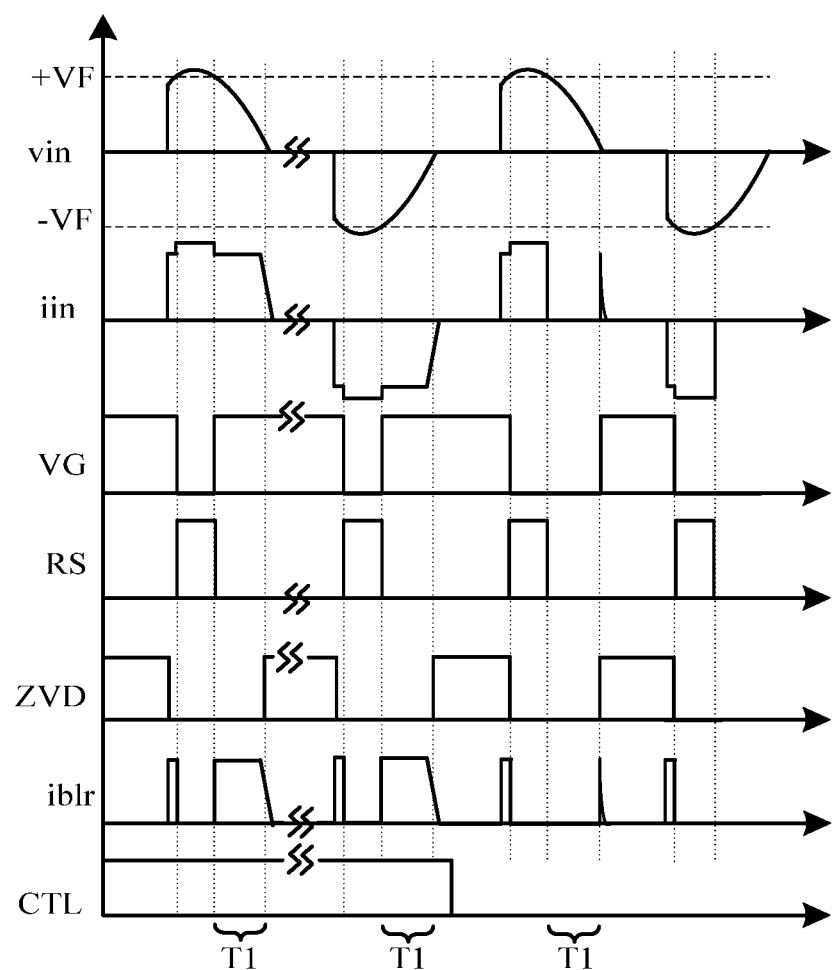
FIG. 10 is a working waveform diagram of embodiment three of the bleeder circuit.

FIG. 10 shows a working waveform of embodiment three of the bleeder circuit of the present invention. Though the waveform of this embodiment is slightly different from that of embodiment two, the technical problems they intend to solve and the ideas to resolve the technical problems are identical.

In the above embodiment, since the current flowing through the load and the current flowing through the linearly driven circuit are equal, the load current is also as the input current of the driving circuit, i.e., the linearly driven input current.

Figure 11:
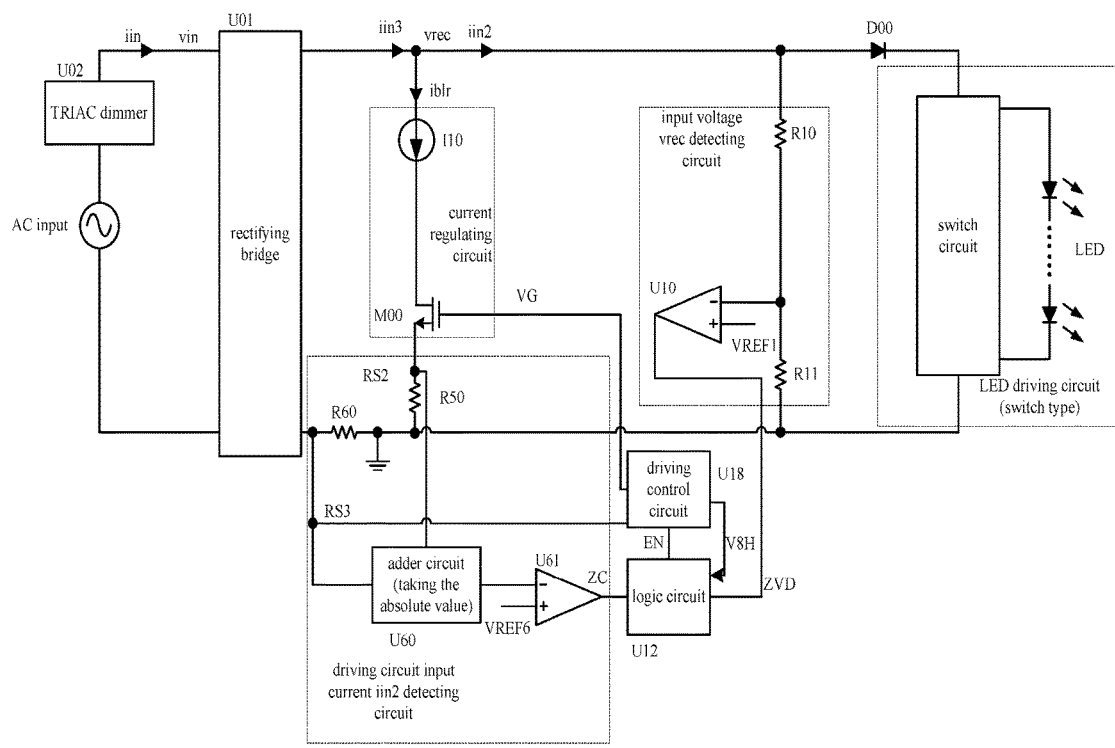
FIG. 11 is a structural schematic view of embodiment four of the bleeder circuit of the present invention.

FIG. 11 shows a circuit structure of embodiment four of the bleeder circuit of the present invention, taking the condition of applying it in the LED control circuit driven by the switch circuit as an example, and it is also applied in a linear driving solution. The LED control circuit comprises a bleeder circuit and an LED driving circuit, and the bleeder circuit is for resolving the flickering problem since the input current of the TRIAC dimmer is too small, and overcomes the technical defects in the prior art. Its input power supply is AC input, and DC input voltage vrec is output from the AC input through the TRIAC dimmer U02 and the rectifying bridge U01, i.e., the input voltage of the driving circuit. The AC input is connected to the rectifying bridge U01 through the TRIAC dimmer U02; the positive output terminal of the rectifying bridge is connected to the anode of diode D00, and the positive terminal of the driving circuit is connected to the cathode of diode D00. Since the LED driving circuit is capacitive, a diode D00 is added between vrec and the LED driving circuit; when the absolute value of the AC input is reduced, since the LED driving circuit is capacitive, the voltage will decrease slowly, and the sample resistor added with diode D00 and the input voltage vrec detecting circuit will make the vrec voltage follow the absolute value of AC input, so as to ensure the accuracy of input voltage sample.

The bleeder circuit comprises a current regulating circuit and a bleeder control circuit; the current regulating circuit comprises a regulating switch M00 and a current source I10 connected in series with the regulating switch, or a resistor connected in series with the regulating switch. One end of the current source I10 is connected to the positive output terminal of the rectifying bridge, and the other end of the regulating switch M00 is connected to the negative output terminal of the rectifying bridge U01. The bleeder control circuit is connected to the control terminal of the regulating switch.

At the first half of the half sine wave, when the input voltage vrec is lower than the threshold voltage (it may be set to a zero cross value), the current regulating circuit is controlled to generate bleeder current by the driving control circuit U18 through the logic circuit U12, and the bleeder current is iblr, and the bleeder current always exists until the input current iin2 of the driving circuit is greater than a corresponding threshold current, meanwhile, the current regulating circuit does not generate bleeder current; at the latter half of the half sine wave, when the input current iin2 of the driving circuit is lower than the corresponding threshold current, the current regulating circuit is made to generate bleeder current by regulating the control terminal of the regulating switch M00 until the input current of the driving circuit is reduced to the low threshold (VREF16 indicates high and low thresholds), and then the current regulating circuit does not generate the bleeder current.

When the input voltage vrec is lower than the threshold voltage, the second time T2 is delayed, and then the current regulating circuit is enabled again to bleed current, and the maximum turning-on angle decreases, so as to reduce the bleeder power consumption of a big turning-on angle. The threshold voltage in this embodiment usually refers to the zero cross point; but according to the actual conditions of the circuit, it can be biased from the zero point, e.g., diode D00 is introduced, and at this time the zero crossing point is usually the forward conduction voltage drop of diode D00.

The bleeder control circuit comprises an enable signal generating circuit and a driving control circuit U18 connected to the control terminal of the regulating switch, and the enable signal generating circuit generates a signal EN indicating whether to enable by detecting input voltage vrec and input current iin2 of the driving circuit, and the driving control circuit U18 receives signal EN indicating whether to enable, and controls the status of the regulating switch M00 according to this. That is, when the current regulating circuit is enabled, the driving control circuit U18 controls the gate voltage of regulating switch M00 in the current regulating circuit, and makes the total input current iin3 not be lower than the set value (e.g. the holding current of the TRIAC dimmer) by controlling the bleeder current iblr. The driving control circuit U18 is disconnected from the control terminal of current regulating circuit to make the current regulating circuit unenabled, and thus the enabling and disabling in this embodiment can be indicated by whether the control terminal of the regulating switch receives the driving voltage, but it is not restricted to this manner.

The enable signal generating circuit includes several function circuits, i.e., including an input voltage detecting circuit, a driving circuit input current detecting circuit, and a logic circuit; in this embodiment, the input voltage detecting circuit determines whether the input voltage vrec is lower than the threshold voltage (indicated by VREF1), and this is compared by comparator U10, and the result is input to the logic circuit; when the input voltage vrec is lower than the threshold voltage, comparator U10 outputs ZVD signals as a high level, and the signal EN is made to indicate enable by the logic circuit. In this drawing, it is marked that the driving circuit input current detecting circuit is input current iin2 detecting circuit, and it may determine whether the driving circuit input current is lower than a threshold value according to the input current iin2 of the driving circuit, and by comparing it with the low threshold (indicated by VREF6); according to the size of V8H in the driving control circuit, it is determined whether the driving circuit input current is higher than the threshold, and the comparison result is input to the logic circuit which output signal EN indicating whether to enable to the driving control circuit U18. The driving circuit input current detecting circuit may connect the sample resistor and the driving circuit in series to detect iin2; however, in order to reduce system power consumption, in this embodiment, the driving circuit input current iin2 is determined indirectly by the total input current iin3 and the bleeder current iblr, and resistor R60 samples the total input current iin3 to get a sample voltage RS3; resistor R50 samples the bleeder current iblr, to get a sample voltage RS2; RS3 is a negative voltage, and RS2 is a positive voltage. Therefore, RS2 and RS3 are added by an adder circuit U60, and an absolute value thereof is taken; when iin2 is close to 0, the output of adder circuit U60 is also close to 0. The output terminal of the adder circuit U60 is connected to the negative input terminal of comparator U61, and the positive input terminal of the second comparator U61 is connected to the low threshold reference signal VREF6; when the input current iin2 is smaller than the threshold, the output ZC of the second comparator U61 is high, and EN is low, and the current regulating circuit is controlled to be unenabled. In this embodiment, the low threshold value is set to a value close to zero, and then the reference signal VREF6 is also close to zero, and thus when the input current iin2 is smaller than the low threshold, the driving circuit input current is close to 0, and thus at this time the TRIAC dimmer does not need to be turned on, and thus it does not need to make the bleeder circuit enabled.

Figure 12:
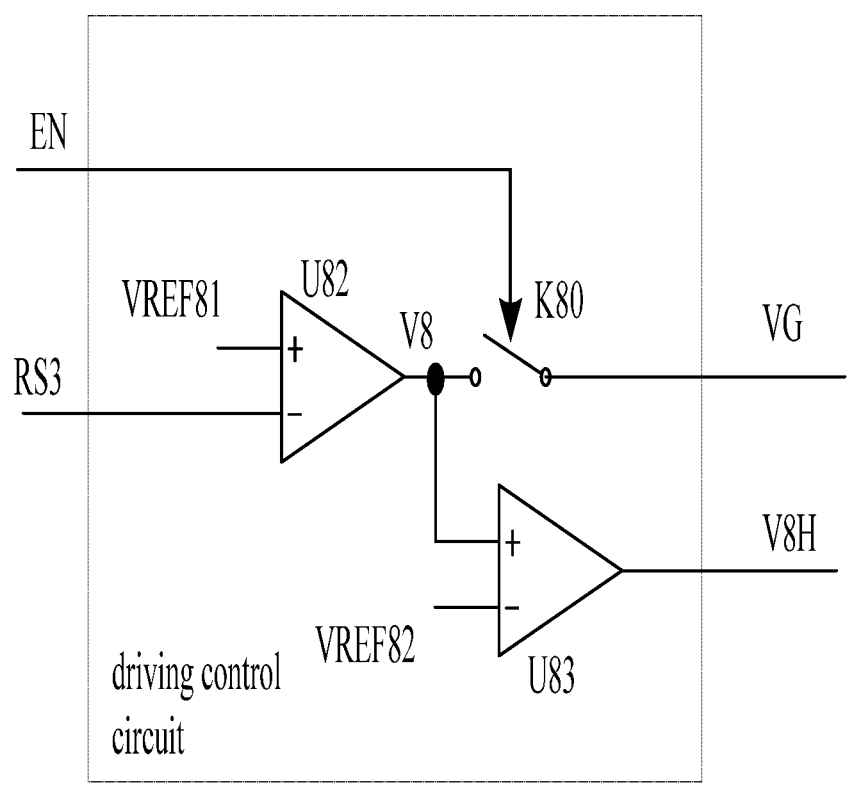
FIG. 12 is a circuit structural diagram of the driving control circuit in FIG. 11.

FIG. 12 shows a specific structure of the driving control circuit in embodiment four. The driving control circuit U18 includes an error amplifier U82 and a first comparator U83; the first input terminal of the error amplifier U82 receives a current sample signal RS3 indicating the input current, and its second input terminal receives the current reference signal VREF81, and its output terminal outputs the driving voltage V8; the output terminal of the error amplifier U82 is connected to the control terminal of the regulating switch M00 through switch K80, and the control terminal of switch K80 receives signal EN to indicate whether to enable; meanwhile, the first input terminal of the first comparator U83 receives the driving voltage V8, and the second input terminal receives reference voltage VREF82 indicating the threshold current; the output terminal of the first comparator U83 outputs signals to indicate the size of the input current iin2 of the driving circuit, and is for getting the corresponding signal EN indicating whether to enable.

Since the driving voltage V8 is used as the driving voltage of the regulating switch and its size decides the size of the bleeder current, it may determine the size of the bleeder current by detecting driving voltage V8 of the driving control circuit U18; when the bleeder current is 0, V8 is 0; or it may determine the size of the bleeder current by directly detecting voltage RS2 indicating the bleeder current of the bleeder circuit.

The voltage on RS3 indicates the size of the input current iin3, i.e., the bleeder current iblr is added with the input current iin2 of the driving circuit; when the enable signal EN is high, Operational amplifier U82 controls its output voltage of terminal VG, to make the RS3 voltage be equal to the reference voltage VREF81. The first comparator U83 compares the output of the Operational amplifier U82 with the reference signal VREF82 indicating the threshold current, to get voltage V8H, and voltage V8H may indicate whether the input current iin2 of the driving circuit is higher than a threshold current. When iin2 is higher than the threshold current, V8H is low; when iin2 is lower than the threshold current, V8H is high.

Figure 13:
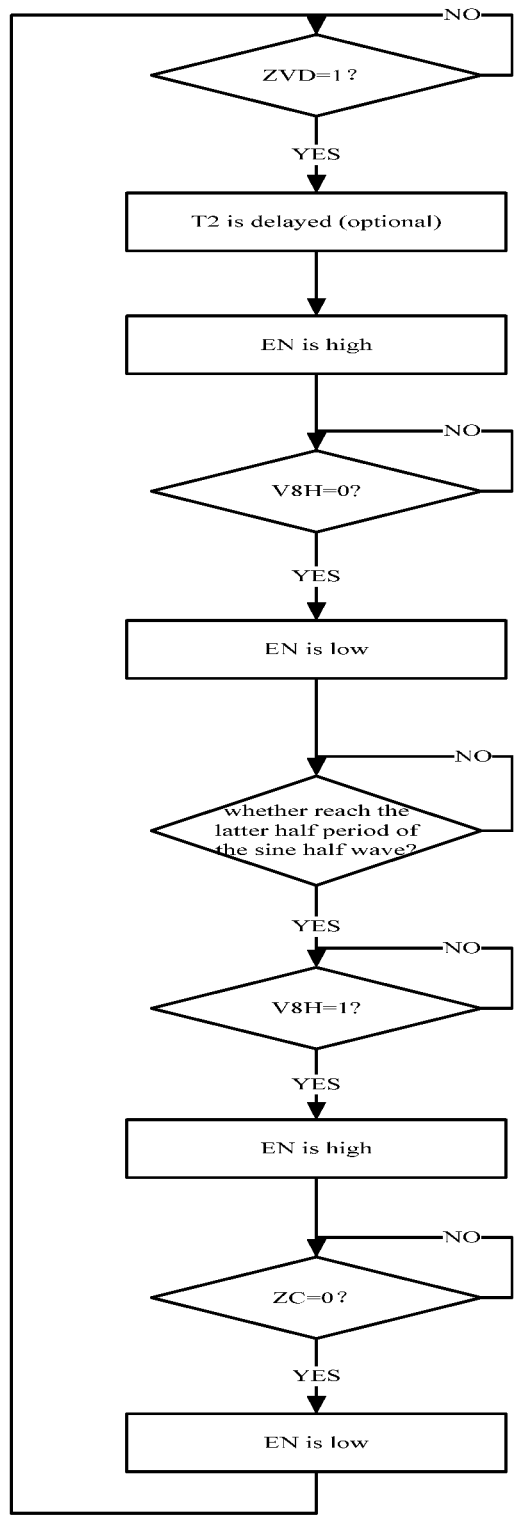
FIG. 13 is a flowchart block diagram of embodiment four of the present invention.

FIG. 13 shows a specific flowchart block diagram of embodiment four. At the previous half period of the half sine wave, it first determines whether the input voltage vrec is lower than the threshold voltage, i.e., the input voltage vrec detecting circuit detects whether the input voltage is lower than the set value; when it is lower than the set value, its output ZVD is high, otherwise, ZVD is low. When ZVD is high, the output EN of logic circuit U12 is high, to enable and drive the control circuit U18. The driving control circuit U18 controls the bleeder circuit to be enabled, and generates bleeder current iblr. Then it determines whether the input current iin2 of the driving circuit is greater than the corresponding threshold current; if it is, V8H=0, and the current regulating circuit is not enabled, and EN is low. It is determined whether it enters in to the latter half period of the half sine wave, and if yes, it further determines whether the input current iin2 of the driving circuit is lower than the corresponding threshold current; if yes, V8H=1, and the current regulating circuit is enabled, and the input current of the driving circuit is further lowered than the low threshold value, i.e., the bleeder current iblr is higher than the threshold value, and the driving circuit input current is close to 0, and at this time it does not need the TRIAC dimmer to be turned on, and the current regulating circuit is unenabled.

Figure 14:
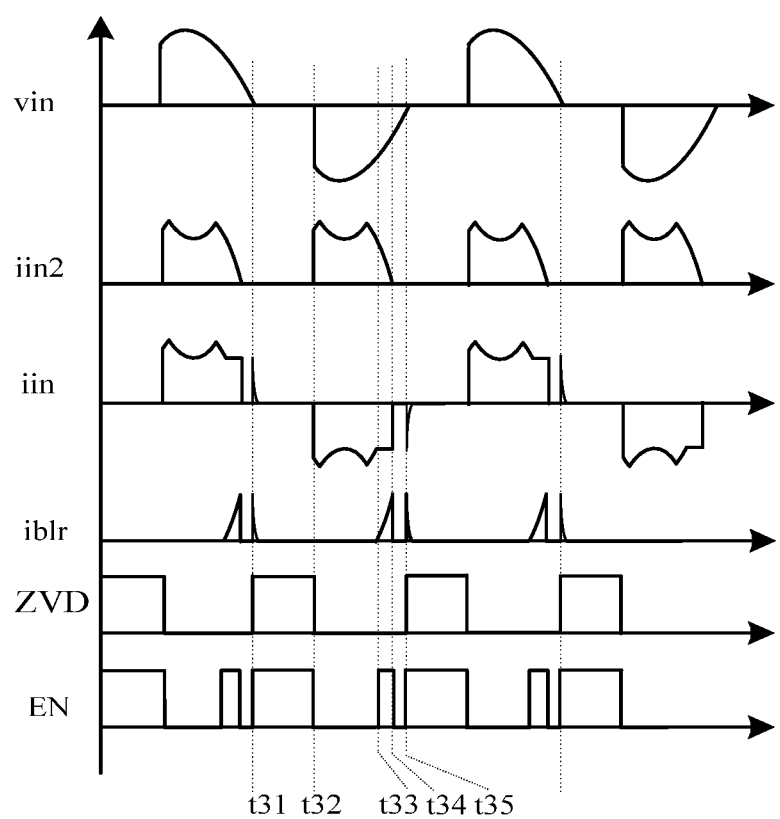
FIG. 14 is a working waveform of embodiment four of the present invention.

FIG. 14 shows a work waveform of embodiment four. When the TRIAC dimmer is turned off, the input current iin is 0, and VG is regulated to the highest voltage, corresponding to time t31 in FIG. 14; since there is a capacitive device at the input side, voltage may be residual on the capacitive device, and thus the bleeder current ilbr has current pulses, and the input current iin3 also has current pulses. At time t32, the TRIAC dimmer is turned on, and the input voltage yin voltage is equal to the AC input voltage; when the input current inn3 is smaller than a set value, the driving control circuit U18 makes the bleeders current iblr plus the input current iin2 not smaller than the set value by regulating the gate electrode of the regulating switch M00, i.e., iin3 is not less than the set value, and the set value is used as the threshold current, and the threshold current is a little higher than the holding current of the TRIAC dimmer. When the input current iin3 is higher than the threshold value, i.e., when V8H is low, the input current iin2 of the driving circuit is greater than or equal to the set value, then the output EN of the logic circuit is 0, i.e., and the bleeder circuit is unenabled, such that the power consumption of the bleeder circuit is reduced. It may determine a size of the bleeder current by detecting V8 in the driving control circuit U18; when the bleeder current is 0, V8 is 0; it may determine a size of the bleeder current by directly detecting voltage RS indicating the bleeder current of the bleeder circuit; when the input current iin2 is smaller than a set value (determining by V8H or by RS2), and then the output EN of the logic circuit is high, i.e., switch K80 of the control driving circuit U18 is controlled to be turned on and to enable the bleeder circuit; at time t34, the Ac input voltage is reduced to 0, and the input current is 0, i.e., input current inn2 of driving control circuit is 0, input current inn3 is equal to bleeder current iblr, and output EN of logic circuit is 0, the voltage of VG is controlled to 0 by driving control circuit, i.e., the bleeder circuit is unenabled.

Figure 15:
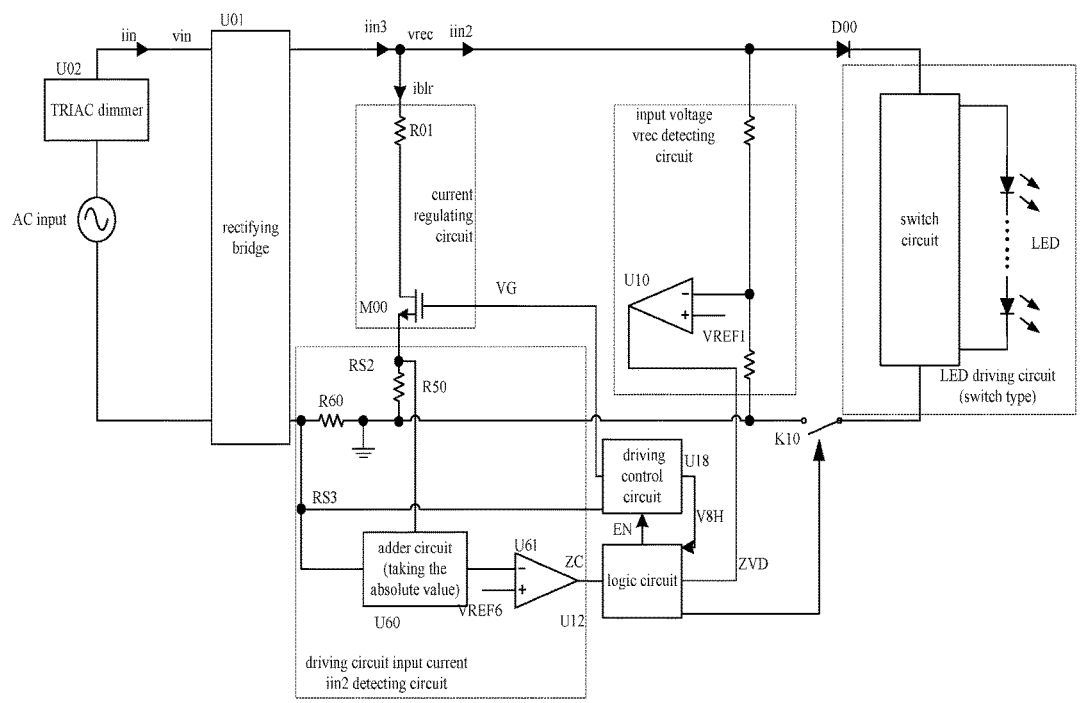
FIG. 15 is a structural schematic view of embodiment five of the bleeder circuit of the present invention.

FIG. 15 shows a specific circuit structure of the bleeder circuit of embodiment five of the present invention. The difference between embodiment five and embodiment four is: in the latter half period of the half sine wave, when the input current iin2 of the driving circuit is smaller than the threshold current, the current regulating circuit is unenabled, and when the logic circuit controls the driving circuit unenabled or disconnect the power supply on the driving circuit by turning off switch K10, in this embodiment, switch K10 is added at the input terminal of the driving circuit. The embodiment is designed according to the features of the driving circuit, and the power consumption is further reduced and the system efficiency is enhanced.

Figure 16:
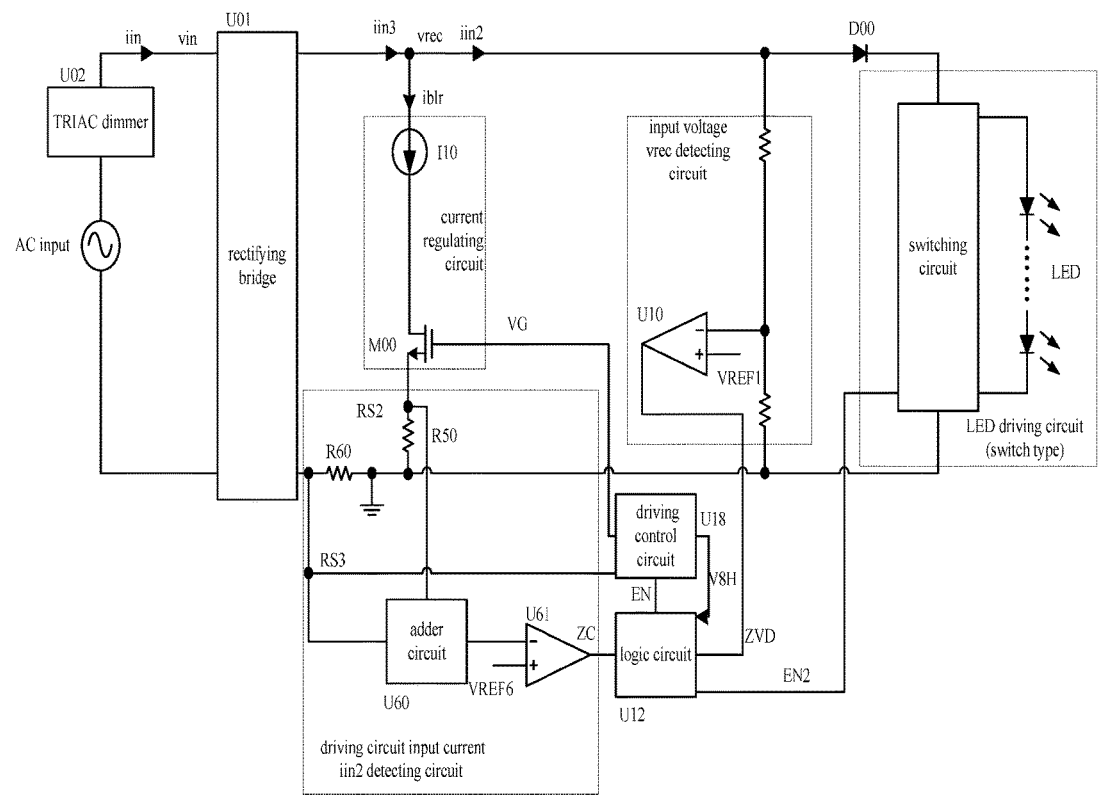
FIG. 16 is a structure schematic view of embodiment six of the bleeder circuit of the present invention.

FIG. 16 shows a specific circuit structure of the bleeder circuit of embodiment six of the present invention. Embodiment six is similar to embodiment five, i.e., at the latter half period of the half sine wave, when the input current iin2 of the driving circuit is smaller than the threshold current, the current regulating circuit is unenabled, and the logical circuit controls the driving circuit be unenabled, and that the control driving circuit is unenabled is made by transmitting another signal EN2 indicating whether to enable to the driving circuit through the logic circuit, and under the above condition, EN2 is high, and the driving circuit is unenabled.

Figure 17:
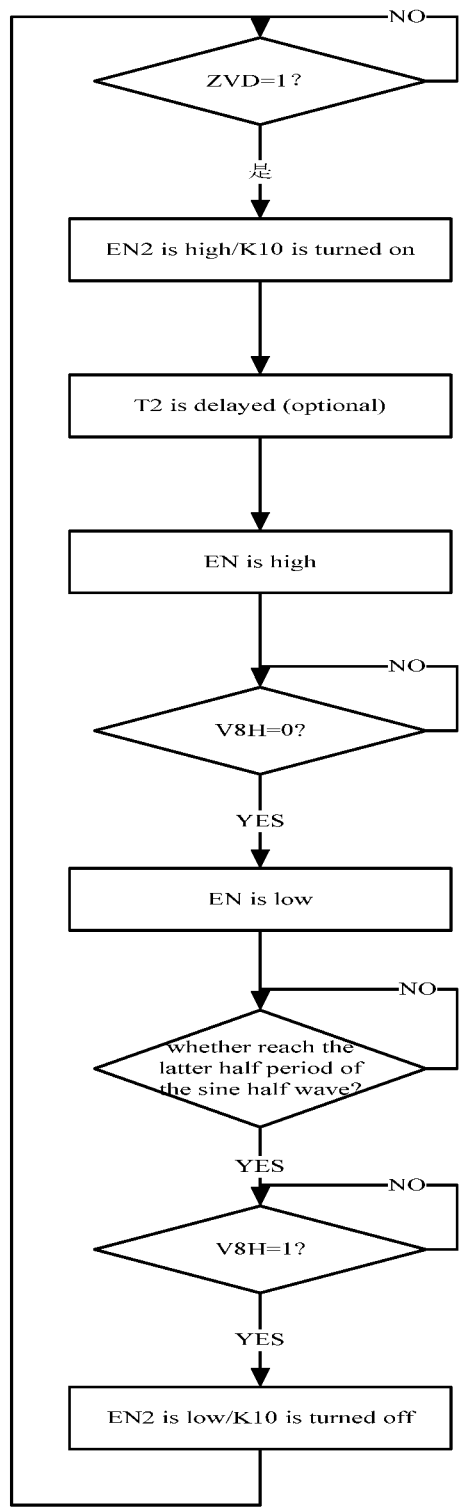
FIG. 17 is a flowchart block diagram of embodiments five and six of the present invention.

FIG. 17 shows a flowchart block diagram of embodiments five and six of the bleeder circuit of the present invention. It differs from the flows of embodiment 4 (i.e., FIG. 13) lies in: at the first half period of the half sine wave, when the input voltage vrec is smaller than a threshold voltage, first, signal EN2 is high or switch K10 is turned on, such that the driving circuit is enabled; at the latter half period of the half sine wave, the input current iin2 of the driving circuit is lower than the corresponding threshold current, then V8H=1, and at this time, enable signal EN2 is low or switch K10 is turned off.

Figure 18:
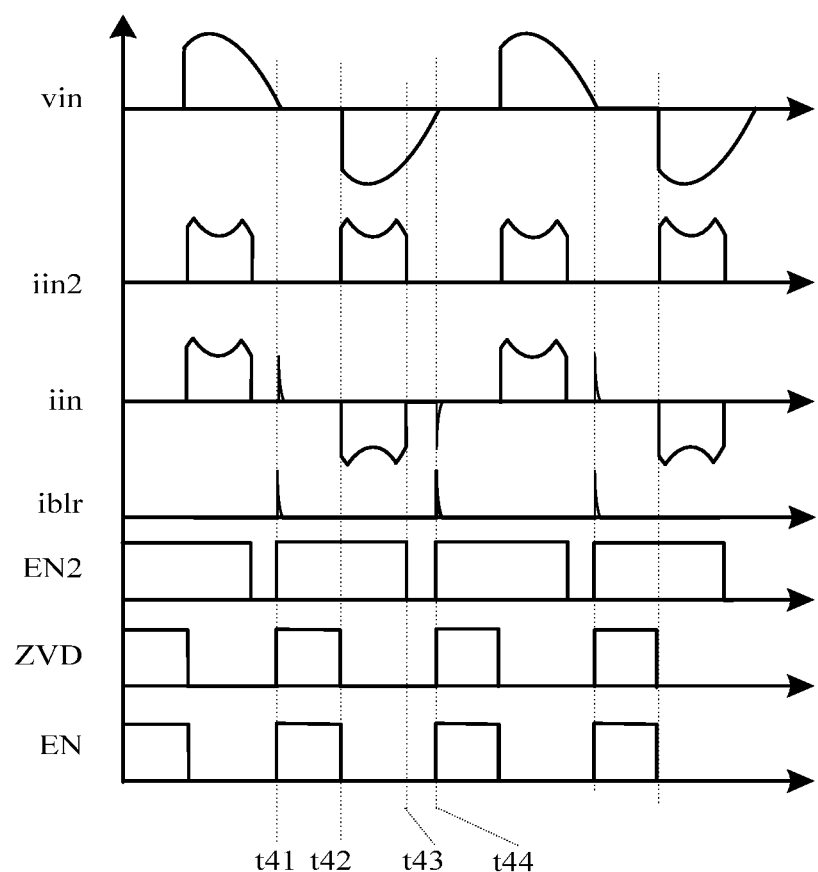
FIG. 18 is a working waveform of embodiments five and six of the present invention.

FIG. 18 shows a work waveform of the bleeder circuit of embodiments five and six of the present invention, and the difference between the work waveform thereof and that of embodiment four lies in: in embodiment four, at time t33, when the input current iin2 of the driving circuit is smaller than a presetted value, the bleeder circuit is enabled; while in embodiments five and six, at time t43 corresponding to embodiment four t33, when the input current iin2 of the driving circuit is smaller than a presetted value, the bleeder circuit is unenabled, i.e., no bleeder current is generated.

Figure 19:
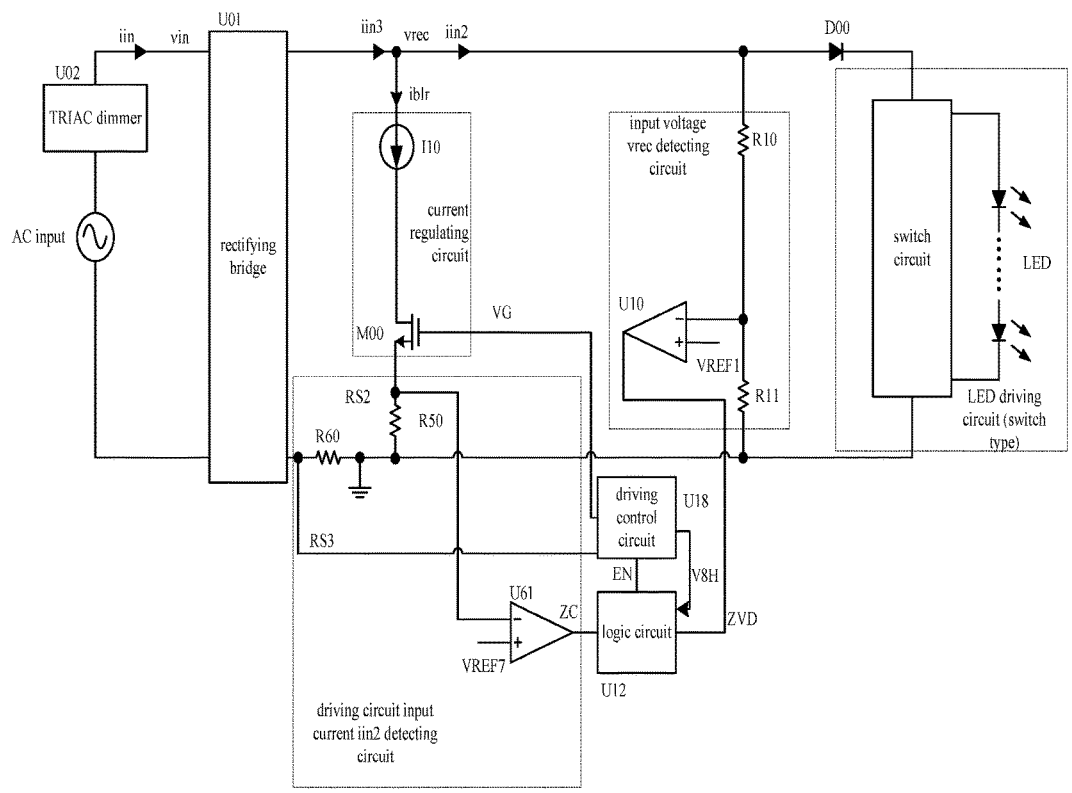
FIG. 19 is a structural schematic view of embodiment seven of the present invention.

FIG. 19 shows a circuit structure of the bleeder circuit of embodiment seven of the present invention, and this embodiment is the improvement of embodiment four, and the main difference lies in the driving circuit input current detecting circuit. That the driving circuit input current detecting circuit detects the input current of the driving circuit is inplemented by the following manner: sampling the bleeder current to get a sample signal indicating bleeder current, and when the sample signal of the bleeder circuit achieves the corresponding reference value, determining that the driving circuit input current achieves the low threshold. That is, the present embodiment compares sample signal with the high threshold by indirectly sampling the bleeder current, so as to realize the comparison of the driving circuit input current and the low threshold. The positive input terminal of comparator U61 is connected to the high threshold reference signal VREF7, and when the bleeder current iblr is higher than the threshold value, output ZC of comparator U61 is high, and then EN is low, and the current regulating circuit is controlled as unenabled. In this embodiment the high threshold value is set as a value close to the holding current, and then reference signal VREF7 is also close to the reference voltage VREF81 in the driving control circuit U18. Therefore, when the bleeder current iblr is higher than the threshold value, the driving circuit input current is close to 0, and thus it may not need to the TRIAC dimmer to turn on, and thus it does not need bleeder circuit to be enable.

In addition, though the above describe and explain the embodiments separately, for common technologies, they can be replaced and integrated among the embodiments to those of ordinary skill in the art; for contents which are not clearly described in one embodiment, it may refer to another embodiment which describe the contents.

The above implementing manners do not define the protection scope of the technical solution. Any amendments, equivalent replacements or improvements made within the spirits and principles of the above implementing manners shall be covered in the protection scopes of the technical solutions.

What is claimed is:

1. A bleeder circuit comprising:
a current regulating circuit comprising a regulating switch and a current source and/or resistor connected in series with the regulating switch; wherein an input voltage is obtained from an alternating current input through a TRIAC dimmer and a rectifying bridge to supply load with power through a driving circuit, two ends of the current regulating circuit connected to high and low potential terminals of the input voltage;
a bleeder control circuit connected to a control terminal of the regulating switch; wherein at a previous half period of a half sine wave when the input voltage is lower than a threshold voltage the current regulating circuit generates bleeder current by regulating a control terminal of the regulating switch until the input current of the driving circuit is greater than a corresponding threshold current, and the current regulating circuit does not generate bleeder current; at the latter half period of the half sine wave when the input current of the driving circuit is lower than the corresponding to the threshold current, the control terminal of the regulating switch is regulated to make the current regulating circuit generate bleeder current until the input current of the driving circuit is reduced to a low threshold, and then the current regulating circuit does not generate bleeder current;
wherein the bleeder control circuit comprises an enable signal generating circuit and a driving control circuit connected to the control terminal of the regulating switch; wherein the enable signal generating circuit generates signals to indicate whether to enable by detecting the input voltage and the input current of the driving circuit, and the driving control circuit receives the signals to indicate whether to enable and controls the status of the regulating switch;
wherein the driving control circuit receives a current sample signal indicating total input current and performs error process on the current sample signal and the current reference signal to get a driving voltage, such that when the current regulating circuit is enabled, the driving voltage is used as the voltage of the control terminal of the regulating switch to regulate bleeder current flowing though the regulating switch;

wherein the driving control circuit comprises an error amplifier and a first comparator, the error amplifier having a first input terminal, a second input terminal and an output terminal and the first comparator having a first input terminal, a second input terminal and an output terminal;

wherein the first input terminal of the error amplifier receives current sampling signals indicating a total input current, the second input terminal receives the current reference signal, and the output terminal outputs driving voltage; the output terminal of the error amplifier is connected to the control terminal of the regulating switch through a switch, and the control terminal of the switch receives a signal indicating whether to enable; the first input terminal of the first comparator receives the driving voltage, and the second input terminal receives a reference voltage indicating a threshold current, and the output terminal of the first comparator outputs signals to indicate whether the input current of the driving circuit achieves the threshold current, and get the corresponding signals to indicate whether to enable.

2. The bleeder circuit of claim 1, wherein the enable signal generating circuit comprises an input voltage detecting circuit, a driving circuit input current detecting circuit and a logic circuit, wherein the input voltage detecting circuit determines whether the input voltage is lower than the threshold voltage, outputs the result to the logic circuit, and the driving circuit input current detecting circuit detects that the input current of the driving circuit achieves the low threshold, and the logic circuit outputs signals indicating enabling of the driving control circuit.

3. The bleeder circuit of claim 2, wherein the driving circuit input current detecting circuit detects that the input current of the driving circuit is implemented by the following steps: sampling the bleeder current to get a sample signal indicating bleeder current, and when the sample signals of the bleeder circuit achieves a corresponding reference value, determining that the input current of the driving circuit achieves the low threshold.

4. The bleeder circuit of claim 1, wherein the driving voltage is for indicating a size of the input current of the driving circuit and comparing the driving voltage with the reference voltage indicating the threshold current, wherein a comparison result indicates whether the input current of the driving circuit achieves the threshold current.

5. The bleeder circuit of claim 2, wherein the driving circuit input current detecting circuit comprises
an adder circuit and a second comparator, the second comparator having a first input terminal, a second input terminal and an output terminal, wherein the adder circuit receives a current sample signal indicating total input current and a current sample signal indicating the bleeder current, and directions of two received current sample signals are opposite, and thus the adder circuit outputs a signal to indicate the driving circuit input current; the first input terminal of the second comparator receives reference signals to indicate a low threshold, and the second input terminal receives signals indicating the driving circuit input current, and the output terminal of the second comparator is connected to the logic circuit.

6. A bleeder circuit comprising:
a current regulating circuit comprising a regulating switch and a current source and/or resistor connected in series with the regulating switch; wherein an input voltage is obtained from an alternating current input through a TRIAC dimmer and a rectifying bridge to supply load with power through a driving circuit, two ends of the current regulating circuit connected to high and low potential terminals of the input voltage;

a bleeder control circuit connected to a control terminal of the regulating switch; wherein at a previous half period of a half sine wave when the input voltage is lower than a threshold voltage the current regulating circuit generates bleeder current by regulating a control terminal of the regulating switch until the input current of the driving circuit is greater than a corresponding threshold current, and the current regulating circuit does not generate bleeder current; at the latter half period of the half sine wave when the input current of the driving circuit is lower than the corresponding to the threshold current, the control terminal of the regulating switch is regulated to make the current regulating circuit generate bleeder current until the input current of the driving circuit is reduced to a low threshold, and then the current regulating circuit does not generate bleeder current;

the bleeder control circuit comprises an enable signal generating circuit and a driving control circuit connected to the control terminal of the regulating switch; wherein the enable signal generating circuit generates signals to indicate whether to enable by detecting the input voltage and the input current of the driving circuit, and the driving control circuit receives the signals to indicate whether to enable and controls the status of the regulating switch;

the enable signal generating circuit comprises an input voltage detecting circuit, a driving circuit input current detecting circuit and a logic circuit, wherein the input voltage detecting circuit determines whether the input voltage is lower than the threshold voltage, outputs the result to the logic circuit, and the driving circuit input current detecting circuit detects that the input current of the driving circuit achieves the low threshold, and the logic circuit outputs signals indicating enabling of the driving control circuit;

the driving circuit input current detecting circuit comprises an adder circuit and a second comparator, the second comparator having a first input terminal, a second input terminal and an output terminal, wherein the adder circuit receives a current sample signal indicating total input current and a current sample signal indicating the bleeder current, and directions of two received current sample signals are opposite, and thus the adder circuit outputs a signal to indicate the driving circuit input current; the first input terminal of the second comparator receives reference signals to indicate a low threshold, and the second input terminal receives signals indicating the driving circuit input current, and the output terminal of the second comparator is connected to the logic circuit.

7. The bleeder circuit of claim 6, wherein the driving circuit input current detecting circuit detects that the input current of the driving circuit is implemented by the following steps: sampling the bleeder current to get a sample signal indicating bleeder current, and when the sample signals of the bleeder circuit achieves a corresponding reference value, determining that the input current of the driving circuit achieves the low threshold.

8. The bleeder circuit of claim 6, wherein the driving control circuit receives a current sample signal indicating total input current and performs error process on the current sample signal and the current reference signal to get a driving voltage, such that when the current regulating circuit is enabled, the driving voltage is used as the voltage of the control terminal of the regulating switch to regulate bleeder current flowing though the regulating switch.

9. The bleeder circuit of claim 8, wherein the driving voltage is for indicating a size of the input current of the driving circuit and comparing the driving voltage with the reference voltage indicating the threshold current, wherein a comparison result indicates whether the input current of the driving circuit achieves the threshold current.

* * * * *